W. H. LONG.
TRANSMISSION MECHANISM.
APPLICATION FILED APR. 12, 1921.

1,427,961.

Patented Sept. 5, 1922.
2 SHEETS—SHEET 1.

INVENTOR
WM. H. LONG

BY
Joseph B. Gardner
ATTORNEY

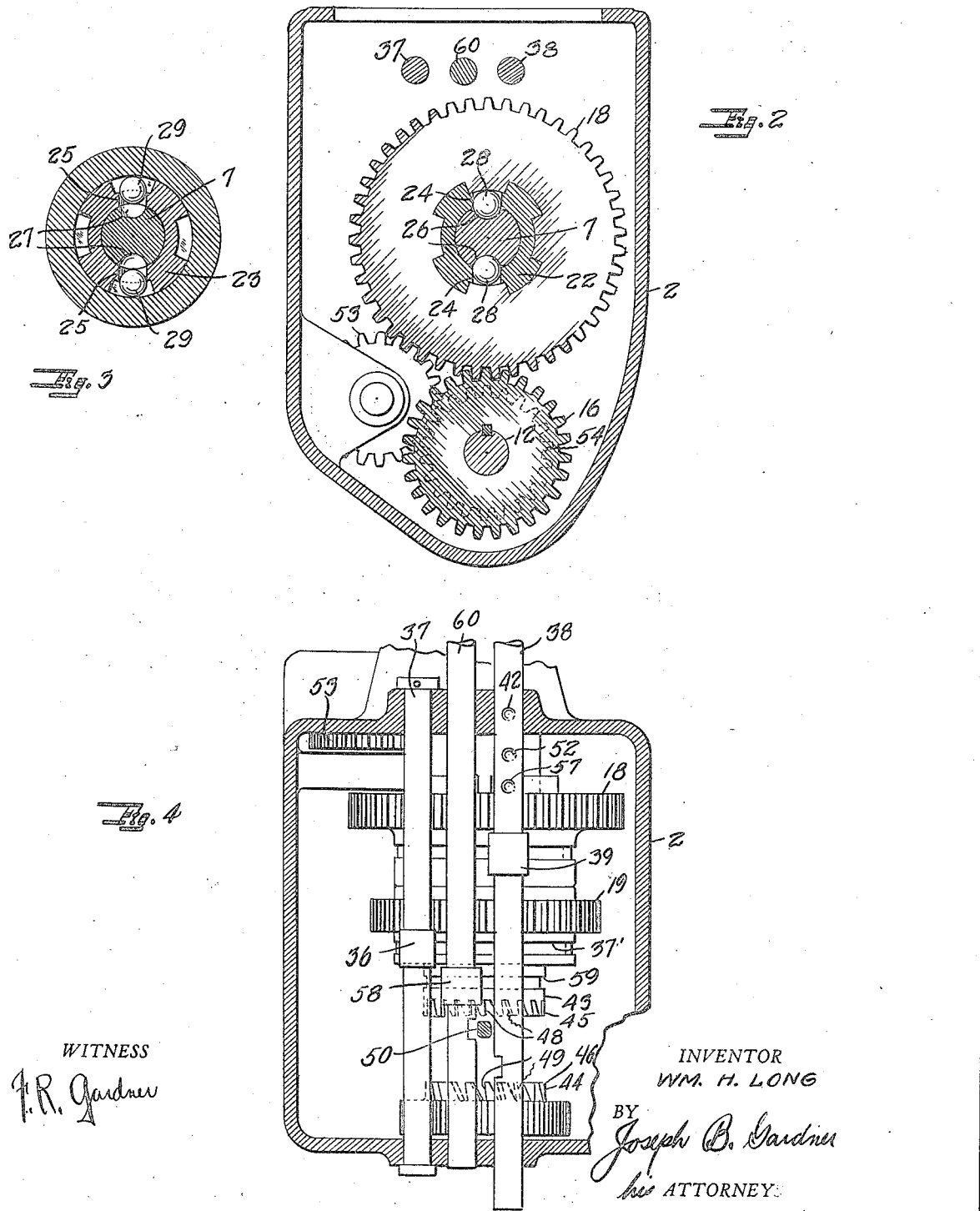

Patented Sept. 5, 1922.

1,427,961

UNITED STATES PATENT OFFICE.

WILLIAM H. LONG, OF BERKELEY, CALIFORNIA.

TRANSMISSION MECHANISM.

Application filed April 12, 1921. Serial No. 460,641.

*To all whom it may concern:*

Be it known that I, WILLIAM H. LONG, a citizen of the United States, and a resident of Berkeley, county of Alameda, and State of California, have invented a new and useful Transmission Mechanism, of which the following is a specification.

My invention relates to a transmission mechanism for automobiles and the like.

An object of the invention is to provide a transmission system for automobiles and the like, in which the speed ratio of the motor and the vehicle may be automatically governed by the speed of the latter.

Another object of the invention is to provide a transmission mechanism in which the different sets of gears for connecting the drive and driven elements together at different speed ratios, are in mesh simultaneously.

A further object is to provide a transmission mechanism in which the drive and driven members are caused to move into direct engagement upon the acceleration of the vehicle speed, but which members will remain in such engagement thereafter notwithstanding a slackening of the speed.

A still further object is to provide a transmission mechanism in which the speed ratio of the drive and driven members may be readily changed even though the vehicle is traveling at an excessive rate of speed.

A further object of the invention is to provide a transmission mechanism in which the speed ratios of the drive and driven members may be changed either by automatic or manually operated means.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 2 is a vertical transverse section of the mechanism taken on the line 2—2 of Figure 1.

Figure 3 is a fragmentary view similar to Figure 2 taken on the line 3—3 of Figure 1.

Figure 4 is a horizontal section of mechanism taken on the line 4—4 of Figure 1.

Figure 1:
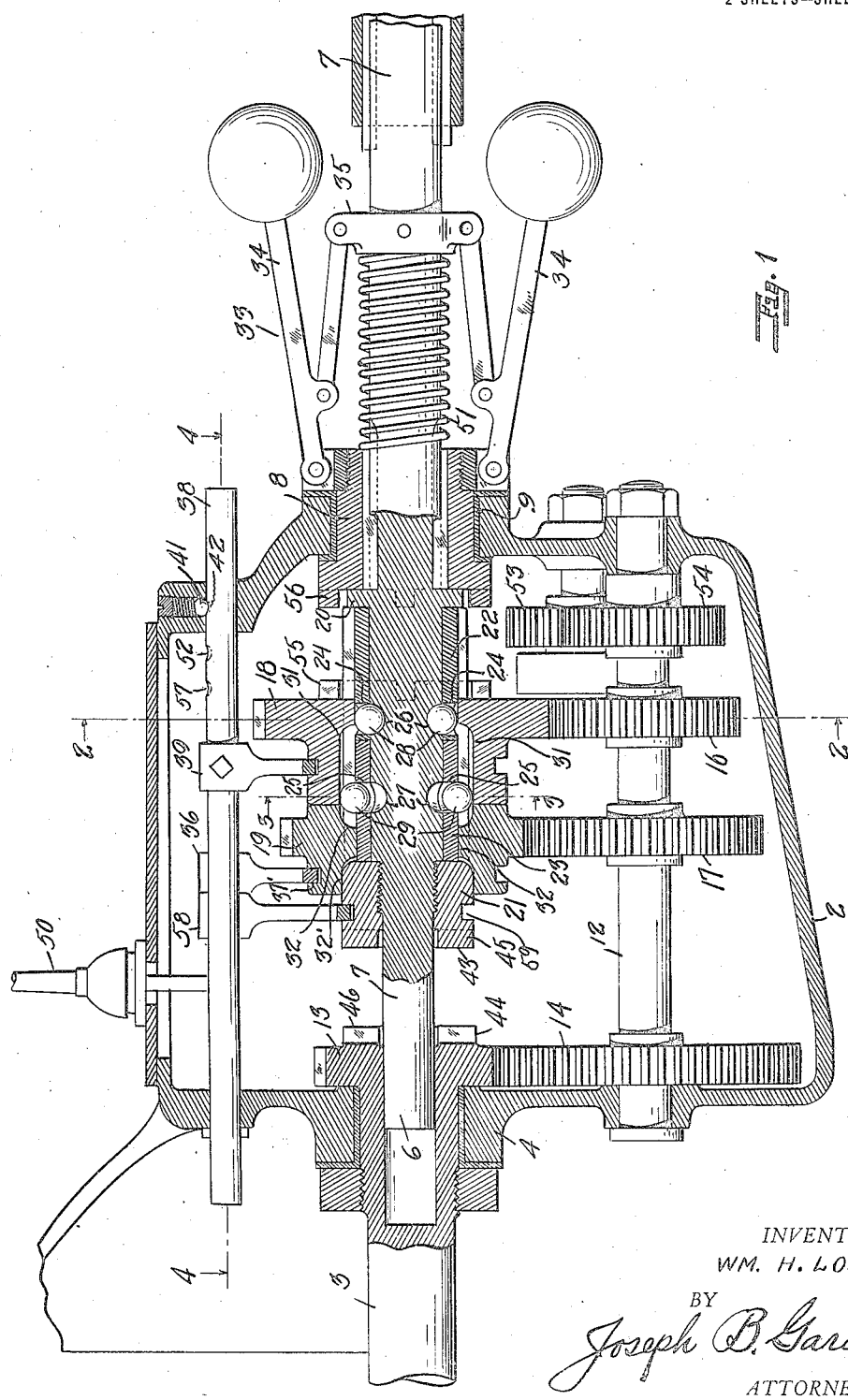
Figure 1 is a vertical longitudinal section of the mechanism.

Briefly expressed the mechanism as embodied in the present form of the invention comprises a drive shaft, a driven shaft axially aligned with and movable longitudinally with respect thereto, a counter shaft driven by the drive shaft, gears of different sizes fixed to the counter shaft and meshing simultaneously with cooperating gears mounted on the driven shaft, means on the driven shaft arranged to engage the gears thereon internally whereby upon the longitudinal displacement of said driven shaft in one direction said gears may be singly successively locked for rotation with the shaft and jointly released for rotation thereon or vice versa, clutch members on the drive and driven shafts adapted to be engaged when said gears on the driven shaft are jointly released, said members being so formed that the turning effort exerted by one clutch against the other acts to draw and retain them in engagement, a centrifugal governor arranged on the driven shaft adapted to displace said shaft longitudinally in accordance with the speed of rotation thereof, and means for varying the speed ratios of the shafts manually if desirable.

A detailed description follows:

The transmission mechanism as here illustrated comprises a housing 2 into which extends the drive shaft 3 that is usually connected to the vehicle engine through a suitable clutch. The shaft 3 is arranged to rotate in a bearing 4 and is bored at its inner end to form a bearing for the end 6 of the driven shaft 7. The driven shaft is further supported in a bushing 8 which is splined thereto and is freely rotatable in a bearing 9 in the rear wall of the housing. The end of the driven shaft emerging from the housing is feathered for engagement with the associated driven mechanism so as to permit longitudinal displacement of the shaft relative thereto for the purpose to be hereinafter described.

Suitably mounted within the housing and lying parallel with respect to the drive and driven shafts is a counter shaft 12 which is connected to the drive shaft by means of the gears 13 and 14 fixed to said shafts. The counter shaft is further provided with a plurality of different sized gears 16 and 17 which are fixed for rotation therewith and are arranged to simultaneously mesh with complementary gears 18 and 19 disposed about the driven shaft. The gears 18 and 19 are splined to sleeves 22 and 23 respectively, which are independently mounted on the driven shaft and held against longitudinal displacement thereon by means of the collars 20 and 21. Each sleeve 22 and 23 is provided with a plurality of openings 24 and 25 respectively, which are transversely aligned with semi-spherical pockets 26 and 27 formed in the shaft. Engaging in the openings 24 and 25 are balls 28 and 29, which when seated in the pockets, lock the associated sleeve and gear to the driven shaft for rotation therewith. The internal face of the gears 18 and 19 are provided with what may be termed cams 31 and 32 which more or less determine the position of the balls in the openings. When the valley of a cam overlies the ball, the latter may seat therein and thereby enable the sleeve and gear associated therewith to be loosely held on the shaft, however when the peak of the cam is caused to overlie the ball, the latter is forced to seat in the pocket and thereby lock the parts together. It will be understood therefore that the engagement of the gears 18 and 19 with the driven shaft 7, is dependent on the longitudinal position of the gears with respect to the shaft.

The peaks and valleys of the cams of both gears 18 and 19 are disposed in such relation that regardless of the position of the gears relative to the shaft, at no time can the balls of both sleeves nest simultaneously in the shaft pockets, but may be alternately engaged therein, or both sets may be disengaged at one time.

Means are provided for displacing the driven gears and shaft longitudinally in order that the desired gear may be locked for rotation with the shaft. In the present embodiment of the invention both manually and automatically operated means are provided. The automatic displacement is effected by means adapted to be controlled by the speed of the vehicle, and to this end a centrifugal governor 33 of the ball type is mounted on the driven shaft. The ball levers 34 of the governor are preferably pivoted to the bushing 8 whereas the collar 35 of the governor is fixed to the shaft. Variations therefore in the speed of the driven shaft will operate to move it longitudinally. Longitudinal displacement of the gear 19 is prevented by means of the yoke 36 which is fixed to the stationary rod 37 and is adapted to engage the annular groove 37' in the gear. Similar displacement of the gear 18 is prevented by means of the yoke 39 attached to a rod 38 which is normally held in the position indicated in Figure 1 by the spring pressed ball 41 engaging in the depression 42 in the rod. With the driven shaft in the position shown in Figure 1, the balls 28 are seated in the shaft pockets 26 thereby locking the gear 18 for rotation with the driven shaft and causing the latter shaft to be rotated with respect to the drive shaft at a speed ratio in accordance with the ratios of the gears 13 and 14, and 16 and 18. Upon the acceleration in the speed of the vehicle, and consequently the driven shaft, the governor will cause the shaft to move forwardly and thereby permit the balls 28 to be ejected from the pockets 26 and enter the valleys, while the balls 29 are forced under the peaks of the cam of the gear 19 to seat in the pockets 27, at which time the speed ratio of the drive and driven shafts will be lessened in accordance with the ratios of the gears 13 and 14, and 17 and 19. Upon the sufficient further increase of the speed of the vehicle, the governor will move the shaft 7 sufficiently forward to cause the balls 29 to be ejected from pockets 27 and engage the valley 32' on the forward side of the cam of gear 19. Thus both gears 18 and 19 are released from the shaft, and upon the continued forward movement of the shaft, the clutch member 43, here shown integral with the collar 21, is placed in engagement with the complementary clutch member 44 preferably formed integral with the gear 13 of the drive shaft, whereby a direct connection between the drive and driven shafts is effected.

The clutch members 43 and 44 are of the jaw type and are provided with teeth 45 and 46 respectively. As clearly shown in Figure 4, the engaging faces 48 and 49 of the teeth are inclined at an angle to the line of movement of the driven shaft. As a result of this construction as soon as the teeth of opposing clutches engage each other, the resistance offered by one clutch against the turning force of the other, will tend to draw them together and retain them so. This enables the clutch members to remain engaged, notwithstanding the resistance of the governor spring 51 upon the slackening of the speed of the drive shaft. The foregoing feature is of considerable importance since it permits of a direct drive even at low speeds of the vehicle, the clutch members remaining in engagement until the engine clutch is disengaged. After the disengagement of the engine clutch the driven shaft is permitted to return to its rearward position wherein the gear 18 is locked thereto.

The gear 18 may be placed in an inoperative position by shifting the rod 38 through the agency of the usual gear shifting lever 50, so that the ball 41 will engage in the depression 52 of the rod and the gear 18 will be held out of engagement with gear 16. In this position the gears may be stated in what is commonly termed "neutral."

In order to drive the shaft 7 in reverse direction, it is merely necessary to shift the rod 38 further to the right (Figure 1) whereby the gear 18 will be moved into mesh with gears 53 and 54, and the side teeth 55 thereon will engage the teeth 56 on the splined bushing 8, the ball 41 at this time being engaged in the depression 57.

The gears may be shifted entirely by manually operated means if desired and to this end there is provided a yoke 58 which is adapted to engage in the groove 59 formed in the collar 21. The yoke is fixed to a rod 60 which similar to the rod 38 is adapted to be manipulated by means of the lever 50. In order to shift the gears manually from "neutral" to direct drive the steps undergone are very similar to those undergone in connection with the automatic shifting and may be effected as follows:

With the driven shaft in its rearward position, gear 18 is shifted by the lever to engage gear 16 thus affording what is generally termed "low gear." To secure the "intermediate" ratio the driven shaft is moved forwardly by the lever whereby the gear 18 is released and the gear 19 locked to the shaft. Upon now moving the shaft further forwardly both gears 18 and 19 are released and the clutch members 43 and 44 placed in engagement thus allowing of the direct connection.

I claim:

1. In a transmission mechanism, a shaft having a pocket, a gear slidably mounted on said shaft, a revoluble member adapted to be moved into or out of said pocket by the longitudinal movement of said shaft relative to the gear whereby said gear will be locked to said shaft for rotation therewith or held freely rotatable thereon when said member is respectively engaged in or disengaged from said pocket.

2. A transmission mechanism comprising a shaft, a sleeve mounted on said shaft, a gear splined to said sleeve, and means operative upon the longitudinal movement of said shaft relative to said gear for placing said sleeve in locked engagement with said shaft for rotation therewith or releasing said sleeve from such engagement.

3. A transmission mechanism comprising a shaft having a pocket, a sleeve mounted on said shaft and provided with an opening, a gear splined to said sleeve, and a ball engaging in said opening and adapted to be moved to seat in said pocket or be removed therefrom by the longitudinal movement of said shaft relative to said gear.

4. A transmission mechanism comprising a shaft having longitudinally spaced semispherical pockets, a plurality of sleeves each mounted on said shaft and provided with an opening arranged to cooperate with one of said pockets, different sized gears splined to said sleeves, and balls engaging in said openings adapted to seat one at a time in said pockets upon the reciprocation of one of the splined members relative to the other whereby the gears may be correspondingly locked one at a time to the shaft for rotation therewith.

5. In a transmission mechanism for a vehicle, a drive shaft, a driven shaft axially aligned therewith, a counter shaft, driving connections between said drive and counter shaft, different combinations of gears simultaneously meshing and connecting said counter and driven shafts together, complementary clutch members fixed to said drive and driven shafts, and means controlled by the speed of the vehicle for retaining the gears on the driven shaft one at a time in locked engagement for rotation therewith or for holding all of them for rotation thereon and causing said clutch members to become engaged.

6. In a transmission mechanism, a drive shaft, a driven shaft axially aligned and movable longitudinally with respect thereto, a counter shaft driven by the drive shaft, different combinations of gears connecting said counter and driven shaft and meshing simultaneously, the gears on said counter shaft being fixed for rotation therewith, means on the driven shaft arranged to engage the gears thereon internally whereby upon the longitudinal displacement of said driven shaft in one direction said gears may be singly successively locked for rotation with the shaft and jointly released for rotation thereon or vice versa, clutch members on the drive and driven shafts adapted to be engaged when said gears on the driven shaft are jointly released and a centrifugal governor arranged on the driven shaft adapted to displace said shaft longitudinally in accordance with the speed thereof.

7. In a transmission mechanism, a drive shaft, a driven shaft axially aligned and movable longitudinally with respect thereto, a counter shaft driven by the drive shaft, different combinations of gears connecting said counter and driven shafts together and meshing simultaneously, the gears on said counter shaft being fixed for rotation therewith, means on the driven shaft arranged to engage the gears thereon internally whereby upon the longitudinal displacement of said driven shaft in one direction said gears may be singly successively locked for rotation with the shaft and jointly released for rotation thereon or vice versa, clutch members on the drive and driven shafts adapted to be engaged when said gears on the driven shaft are jointly released, said members being so formed that the turning effort exerted by one clutch against the other tends to draw and retain them in engagement, automatic means for displacing said driven shaft longitudinally, and manually operative means for displacing said driven gears longitudinally.

In testimony whereof, I have hereunto set my hand at Oakland, this 4th day of April, 1921.

WILLIAM H. LONG.